United States Patent [19]
Simon

[11] 4,015,468
[45] Apr. 5, 1977

[54] DEVICE FOR THE MEASUREMENT OF THE RADIAL FORCE SUSTAINED BY A ROTARY ORGAN

[76] Inventor: François Simon, Chemin des Molieres, Le Viviers Du Lac, France, 73420

[22] Filed: July 3, 1975

[21] Appl. No.: 592,892

[30] Foreign Application Priority Data
July 12, 1974 France ............................ 74.24304

[52] U.S. Cl. .................................. 73/136 R; 73/143
[51] Int. Cl.² ........................................... G01L 5/00
[58] Field of Search ................. 73/136 R, 140, 143, 73/144

[56] References Cited
UNITED STATES PATENTS
3,902,363  9/1975  Ishimoto ........................ 73/144 X
FOREIGN PATENTS OR APPLICATIONS
1,081,907  9/1967  United Kingdom ................. 73/144

*Primary Examiner*—Charles A. Ruehl
*Attorney, Agent, or Firm*—Toren, McGeady and Stanger

[57] ABSTRACT

A device for measurement of the radial force sustained by a rotary organ, constituted by at least one detector of the deformation in the direction of the radial force to be measured in at least one of the elements constituted by two coaxial annular organs and a connecting one of the annular organs to a support.

10 Claims, 14 Drawing Figures

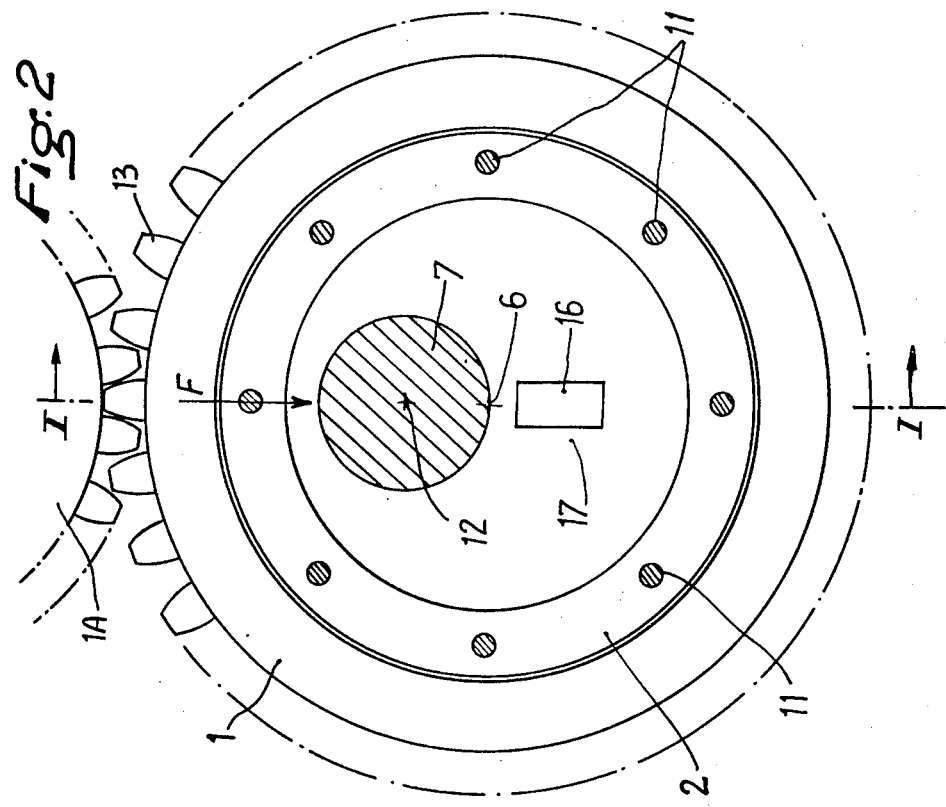
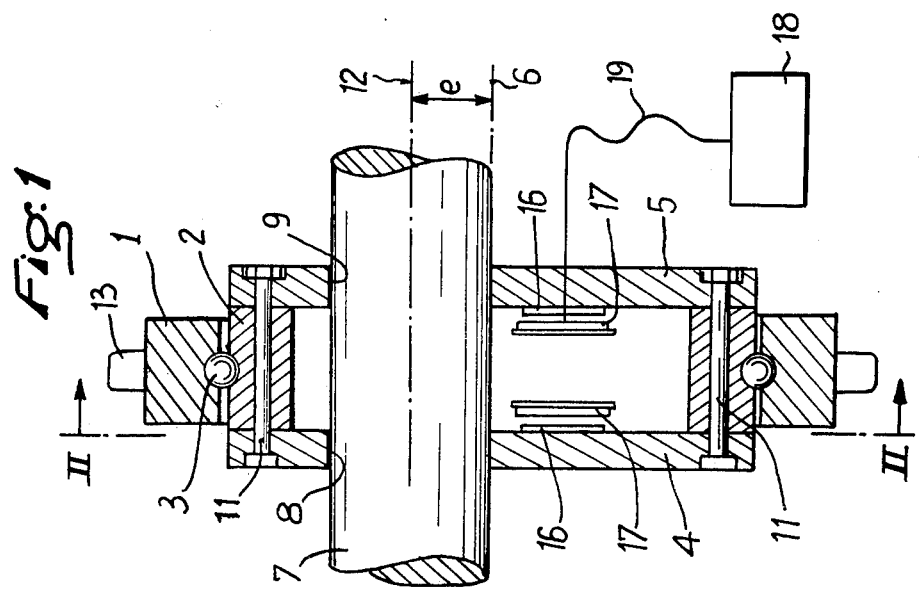

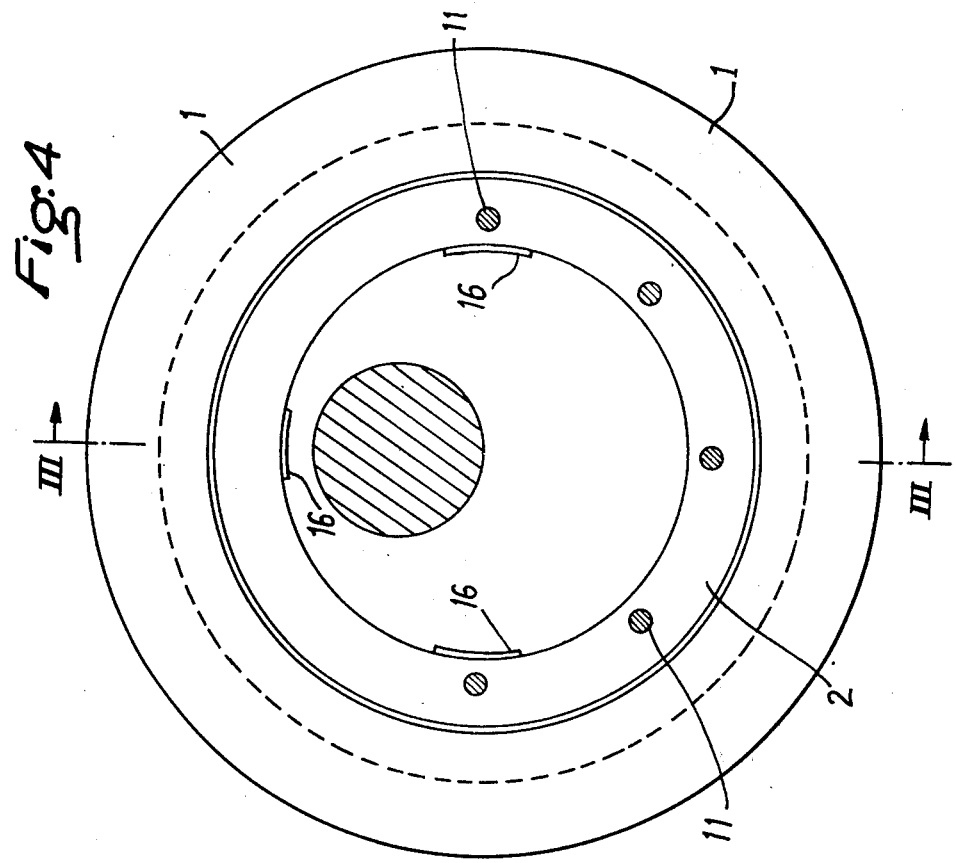
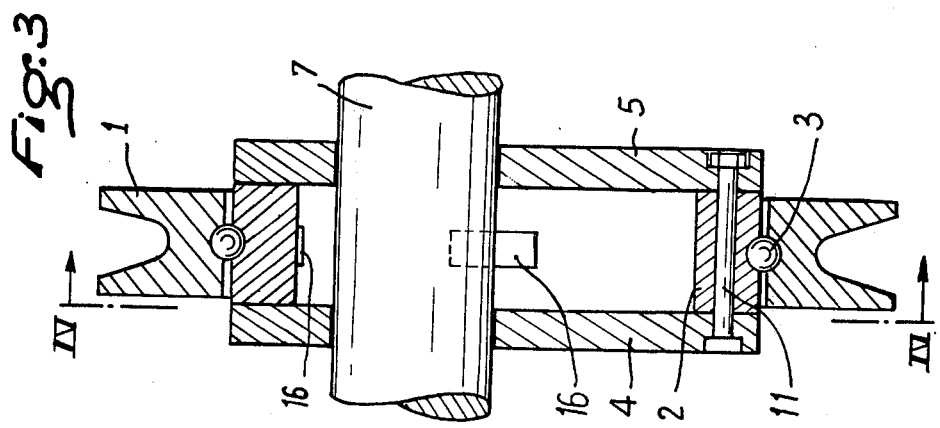

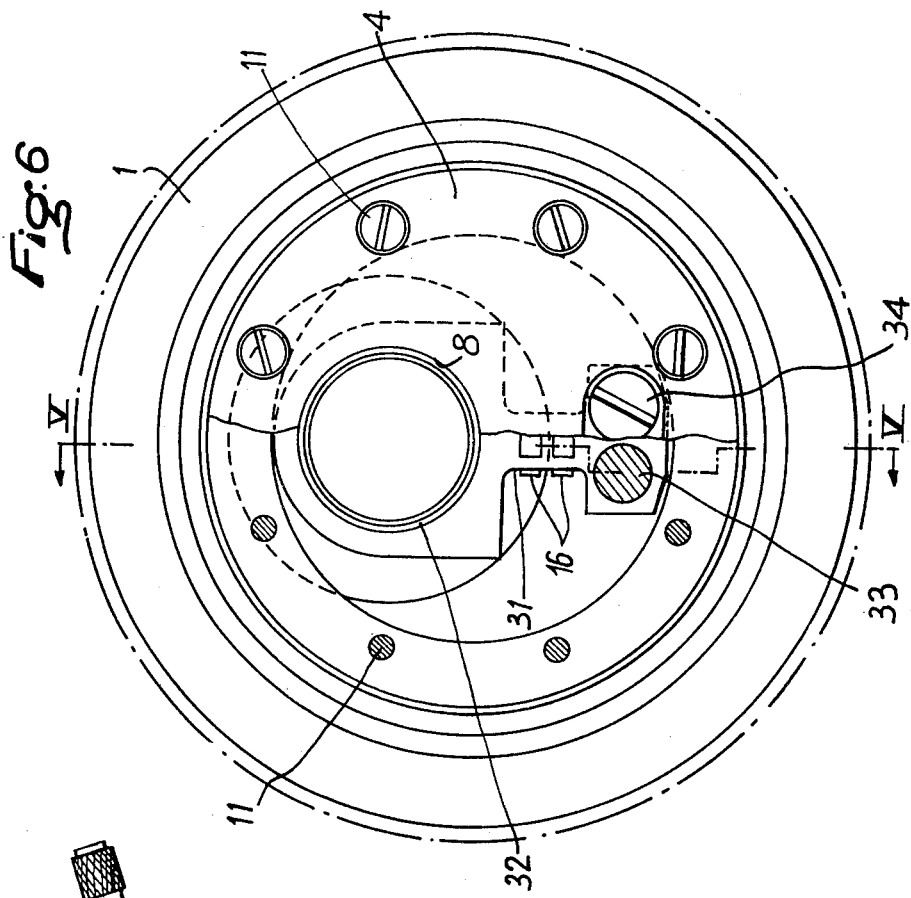

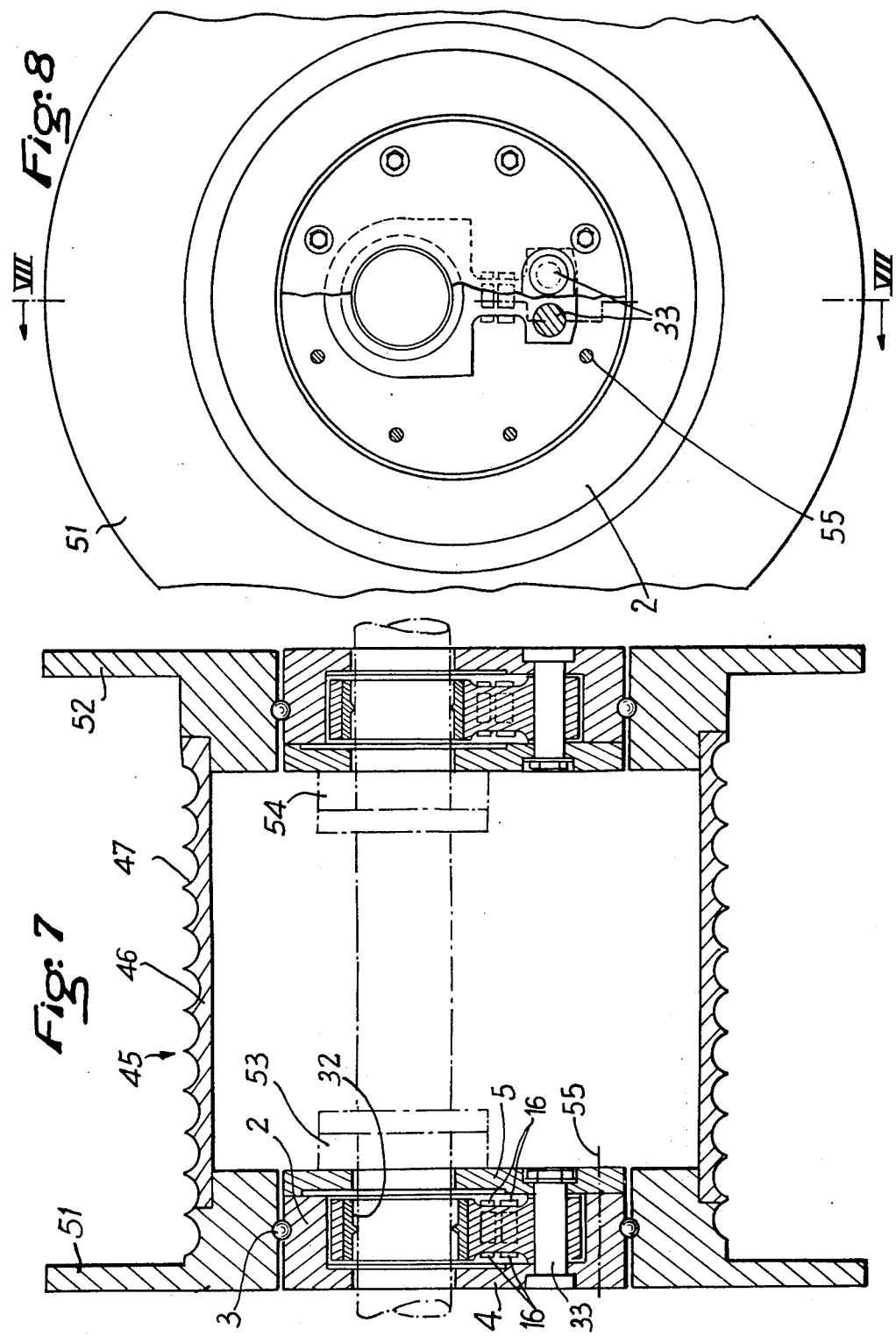

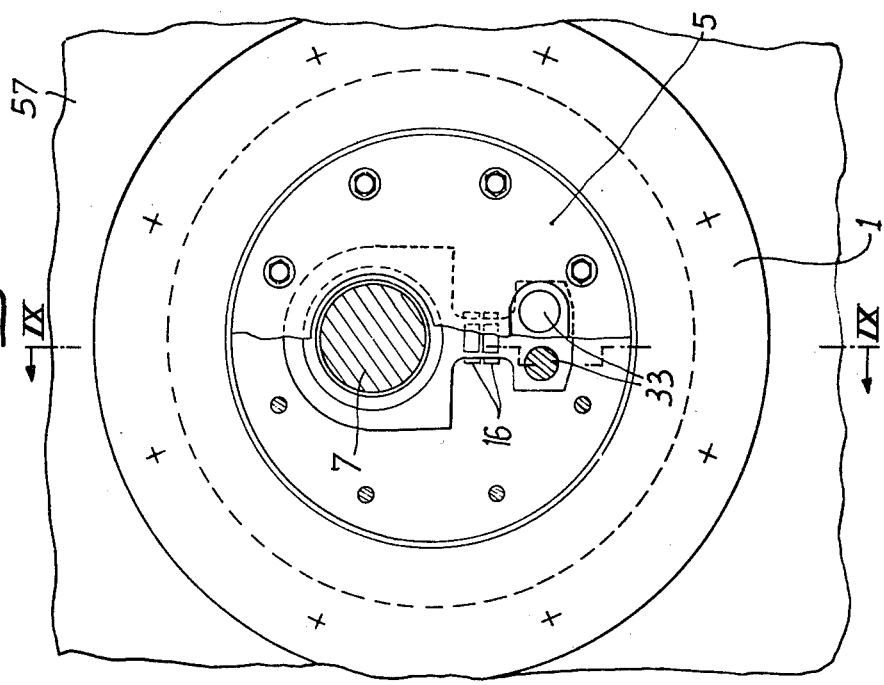
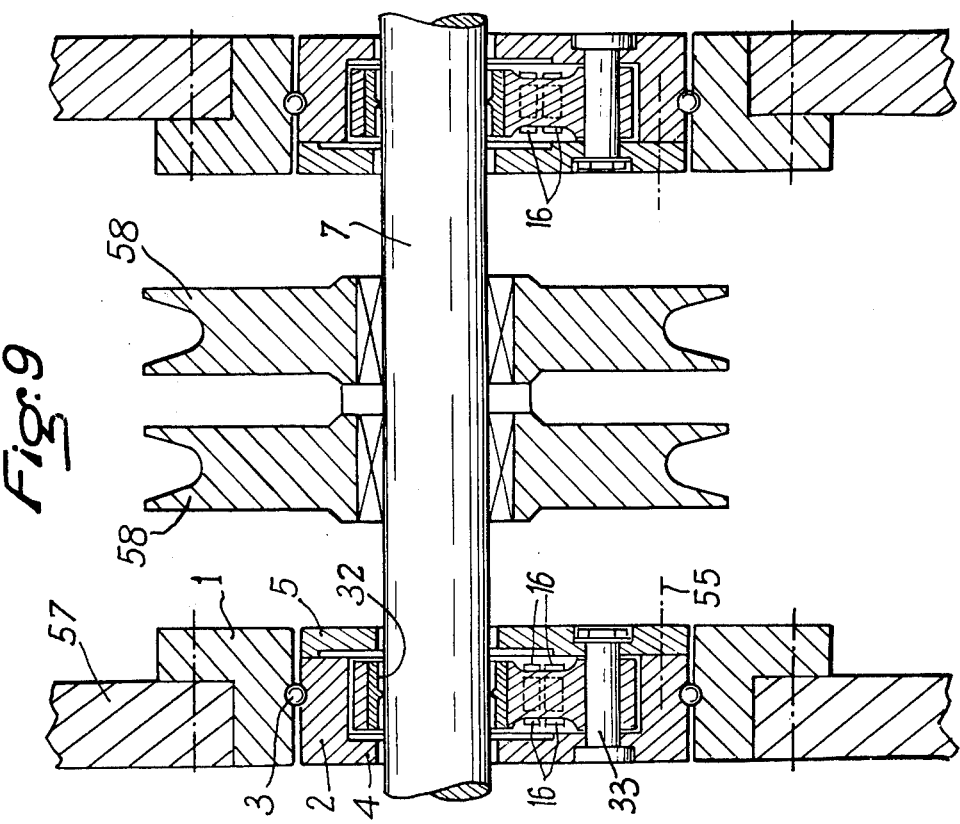

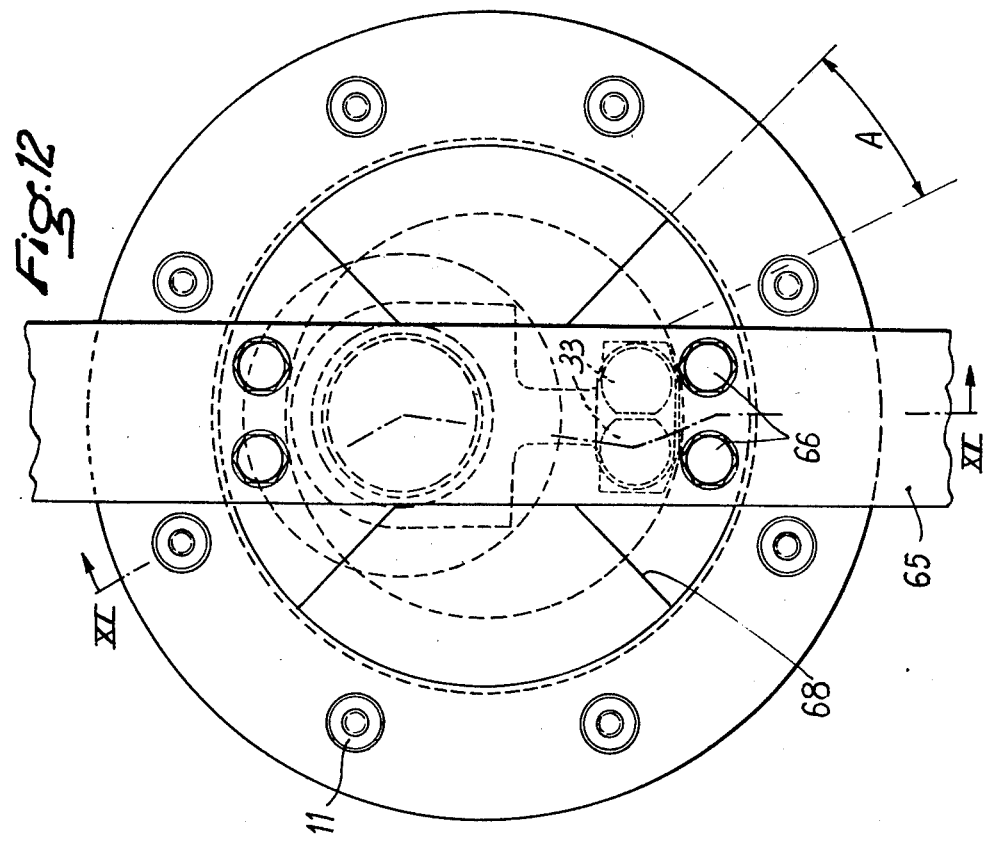
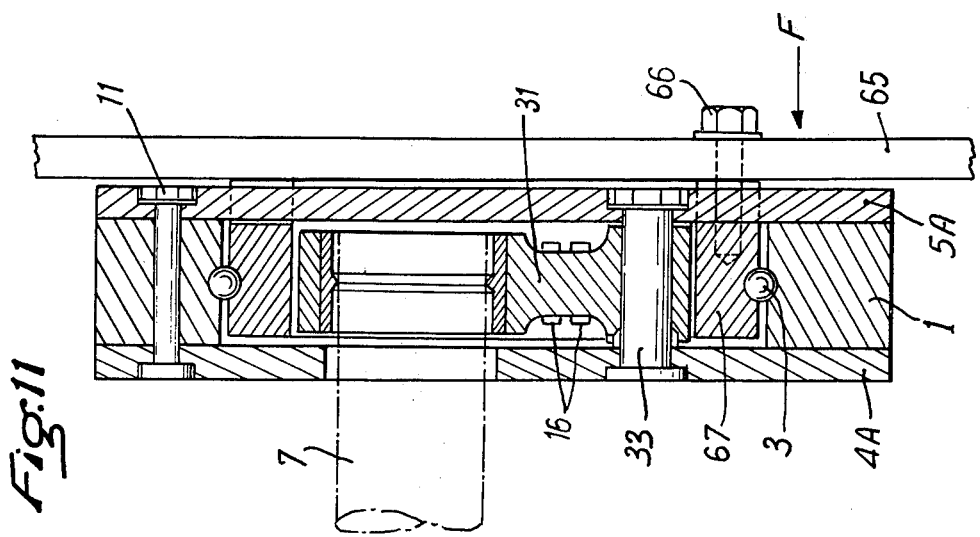

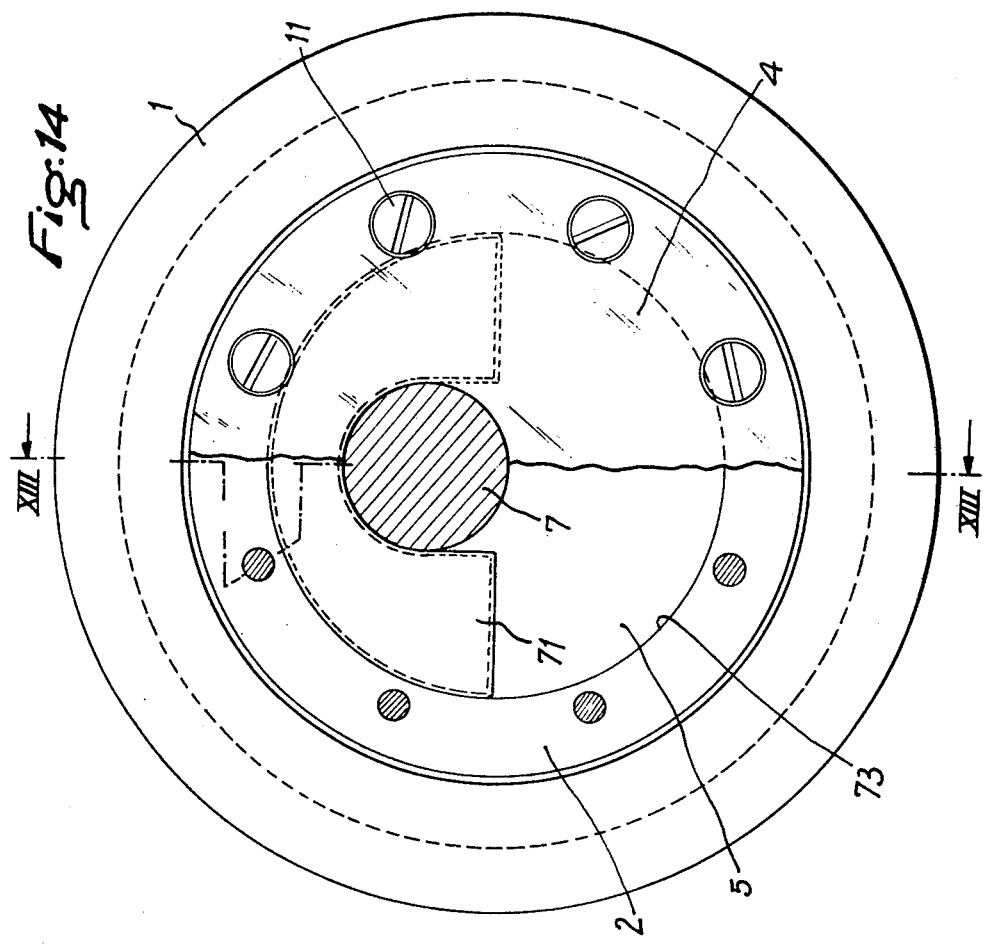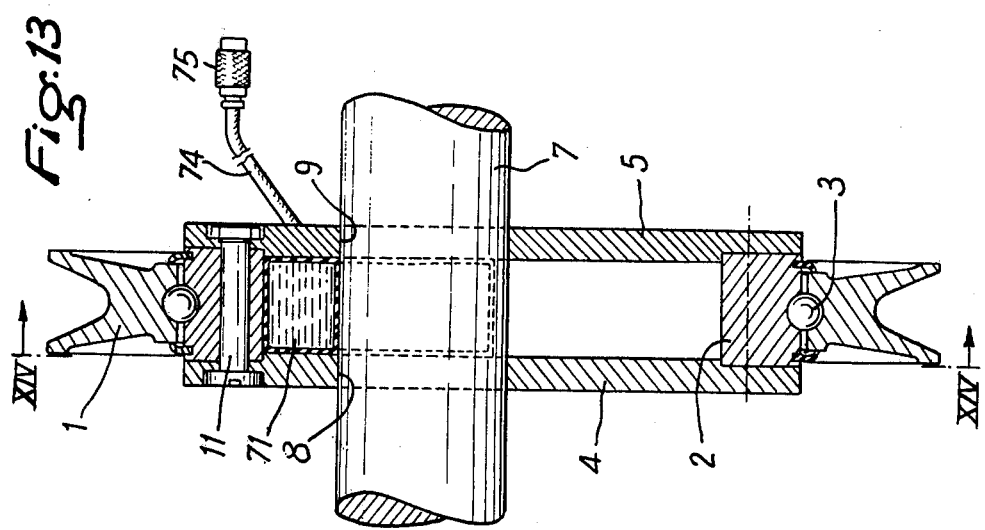

DEVICE FOR THE MEASUREMENT OF THE RADIAL FORCE SUSTAINED BY A ROTARY ORGAN

BACKGROUND OF THE INVENTION

The invention relates to devices for measurement of the radial force sustained by a rotary organ such as a pulley, a roller, a cog wheel, a brake drum, a shaft, etc.

More precisely, the subject of the invention is a device for measurement of the relative radial force between, on the one hand, two coaxial annular organs mounted to rotate one inside the other about an axis and, on the other hand, a support to which one of said two annular organs is connected by means of a connecting device comprising two cheeks.

SUMMARY OF THE INVENTION

According to the invention, the measuring device is constituted by at least one detector of the deformation in the direction of the radial force to be measured in at least one of the elements constituted by the two coaxial annular organs and the above-mentioned connecting system.

It is clear that with such a measuring device, given that the detectors are so arranged and designed as make measurements of the deformation of the connecting organs in a direction which is that of the force to be determined, measurements of a high accuracy can be obtained. In addition, this accuracy is maintained even in the case in which the direction of the radial force is variable if the support is constituted by a shaft eccentric with respect to the axis of relative rotation of the two annular organs in that the device detects deformations either in the system connecting the support with one of the two coaxial organs or in said annular organ itself because said annular organ and the connecting organs in question will always automatically orientate themselves, about the axis of relative rotation of the two annular organs, in the direction of the resultant radial force.

In certain embodiments, the annular organ which is not connected to the cheeks takes the form of a pulley, a roller, a cog wheel, the cheek of a winch drum, or the like, while in other embodiments it is fixed and the device as a whole constitutes a pillow block for the shaft.

BRIEF DESCRIPTION OF THE DRAWINGS

The invention will be better understood on reading the following description and examining the attached drawings which show, as non-limiting examples, some embodiments of the device for the measurement of radial force according to the invention.

In these drawings:

FIG. 1 is a longitudinal section along the line I—I of FIG. 2 of a first embodiment, the rotary organ of which is a cog wheel.

FIG. 2 is a transverse section along the line II—II of FIG. 1.

FIG. 3 is a longitudinal section along the line III—III of a second embodiment, the rotary organ of which is a grooved pulley.

FIG. 4 is a transverse section along the line IV—IV of FIG. 3.

FIG. 5 is a section along the broken line V—V of FIG. 6 of a third embodiment.

FIG. 6 is a profile view with cutaway parts corresponding to FIG. 5.

FIG. 7 is a section along the line VII—VII of FIG. 8 through a fourth embodiment in which the rotary organs of two similar associated devices form the cheeks of the drum of a winch.

FIG. 8 is a view in profile with parts cut away corresponding to FIG 7.

FIG. 9 is a section along the line IX—IX of FIG. 10 through a fifth embodiment in which two associated devices act as pillow blocks for a shaft which carries grooved pulleys.

FIG. 10 is a profile view with cut away parts corresponding to FIG. 9.

FIG. 11 is a section along the line XI—XI of FIG. 12 through a sixth embodiment in which the inner rotary annular organ is fixed.

FIG. 12 is a front view in the direction of the arrow F of FIG. 11.

FIG. 13 is a section along the broken line XIII—XIII of FIG. 14 through another embodiment in which the device for measuring force comprises a deformable elastic membrane filled with a fluid, and FIG. 14 is, in its right-hand half, a profile view corresponding to FIG. 13 and, in its left-hand half, a section along the line XIV—XIV of FIG. 13.

DETAILED DESCRIPTION OF THE INVENTION

The device illustrated in FIGS. 1 and 2 comprises two co-axial annular organs, viz an outer annular organ 1 and an inner annular organ 2, mounted to rotate with respect to each other, for example by means of an annular array of rolling bodies, such as balls 3. In the example, the outer annular organ 1 is a cog wheel in mesh with a further cog wheel 1A while the inner annular organ 2 is constituted by a cylindrical crown with two circular cheeks or support flanges 4 and 5, the axis of which is denoted by 6, fixed against the faces of the extremity of said crown.

A fixed shaft 7 is mounted in two corresponding bores 8, 9 in the two cheeks or support flanges 4, 5, respectively, and the geometric axis 12 of this shaft is offset relative to the geometric axis 6 of the cheeks by a value e.

In operation, the teeth 13 of wheel 1 are subjected to forces the radial resultant of which is shown by the arrow F in FIG. 2. Because of the offsetting of the two axes 6 and 12 by the amount e, the various parts of the device take up the relative positions shown in the drawing; that is, said two axes lie in one plane which also contains the resultant radial force F. In order to measure the relative radial force between the cog wheel 1 and the shaft 7, means for detection of deformation of the cheeks or support flanges 4 and 5 are provided, where said cheeks make the connection between the shaft 7 and the inner annular organ 2. In the example, these means of detection are constituted by compression strain gauges 16 associated with amplifiers 17 and fixed against the internal faces of the two cheeks 4, 5 in order to measure the deformation of said cheeks, this deformation being a function of the radial force F applied by the cog wheel 1 to the shaft 7 through the intermediary of the annular row of balls 3, the inner annular organ 2 and the two cheeks 4 and 5. The variation in the characteristics of the compression strain gauges is utilized in a known manner by all the appropriate circuits required to provide indications of the value of the force, preferably as direct readings. In FIG.

1, there is shown a recording instrument 18 connected to amplifier 17 by means of a flexible line 19.

FIGS. 3 and 4 illustrate another embodiment in which, as a variant, the outer annular organ 1 has the form of a grooved pulley while the compression strain gauges 16 are arranged against the internal cylindrical surface of the inner annular organ 2, preferably in three positions situated, respectively, on the upper part of said surface and in zones close to the two ends of a horizontal diameter, as shown in FIG. 4. In order that those parts of the inner annular organ 2 which carry the compression strain gauges shall not be prevented from undergoing free elastic deformation, the two cheeks 4 and 5 are fixed to the frontal faces of said inner annular organ 2 only within the lower half of the latter, as indicated by the bolts 11.

In another embodiment, illustrated in FIGS. 5 and 6, connection between the shaft 7 and the cheeks 4, 5 is not made directly within the bores 8 and 9 in the latter, which bores therefore have a diameter greater than that of said shaft, but through the intermediary of a connecting-rod 31 the head of which pivots on the shaft 7 through the intermediary of a sleeve 32 of plastic material while its foot is traversed by two axles 33 which also pass through the two cheeks 4, 5. Each of these axles has a head 34 countersunk in the thickness of one of the cheeks and a threaded end 35 on which there is mounted a screw 36 countersunk in the thickness of the other cheek 5.

In this example, the compression strain gauges 16 and the amplifiers 17 associated with them are arranged against the body of the connecting-rod 31 which has the form of a small bar of rectangular cross-section, the dimensions of which are adjusted, taking into account the characteristics of the material from which the connecting-rod is made, to the value of the forces arising from the cog wheel 1 which said connecting-rod is required to transmit to the shaft 7 through the intermediary of the balls 3, the intermediate annular organ 2 and the two cheeks 4, 5. In this case also the compression strain gauges are completely protected by the two cheeks of the device.

Given that, in this example, neither the cheeks 4, 5 nor the inner annular organ 2 play any part, through interpretation of their deformations, in the evaluation of the load which they transmit, the inner annular organ 2 may be fixed to the cheek by the bolts 11 over the whole of its periphery.

In the example illustrated, the sleeve 32 of plastic material has, within its bore, a median annular rim 38 of V-section which bears on the shaft 7 so as to ensure perfect relative centering of the forces which come into play in various parts of the device. This sleeve of plastic material with its internal annular rim can be replaced by any equivalent system, in particular a ball-and-socket system.

FIGS. 7 and 8 illustrate an application derived from the embodiment of FIGS. 5 and 6, comprising two devices of the type of FIGS. 5 and 6 combined to form a winch drum assembly 45. The winch drum comprises a tubular section 46 with generally cylindrical form with a helicoidal groove 47 for winding a cable, this section being fixed at its two extremities on to two cheeks 51, 52 which constitute the outer annular organs corresponding to the organ 1 of FIGS. 5 and 6. In addition, in this example, the inner annular organ 2 is a part integrating the cheek 4 and the cheek 5 and is fixed by screws 55 with countersunk heads. Other parts of the device are identical with those of FIGS. 5 and 6 and have been denoted by the same reference numbers. The shaft 7 is carried by two fixed supports 53, 54. The radial force exerted on the drum 45 is thus equal to the sum of the forces registered by the compression strain gauges of the two devices which, respectively, support the two extremities of said drum.

FIGS. 9 and 10 illustrate a fifth embodiment which may be considered derived from that of FIGS. 7 and 8 but in which the outer annular organs 57 no longer form the cheeks of a winch drum but are fixed organs in the interior of which there are centered the two devices in which are mounted the two ends of the shaft 7 which carries grooved pulleys 58, numbering two in this example. These pulleys could also be replaced by other elements, such as cog wheels for example. The other organs of the assembly are in each case denoted by the the same reference numbers as in FIGS. 5 to 8. The total radial force supported by the the pulleys 58 and transferred to the shaft 7 in thus equal to the sum of the forces registered by the compression strain gauges associated with the two devices which support said shaft.

FIGS. 11 and 12 illustrate a sixth embodiment in which the cheeks 4A, 5A are no longer rigidly fixed to the inner annular organ but are fixed to the outer annular organ 1 by means of bolts 11. The whole device is fixed on to a support 65 by means of screws 66 which pass through said support and fit into a part 67 of the inner annular organ 2 which projects on the external face of the cheek 5A through orifices 68 in the form of circular arcs formed in said cheek is such a way as to allow the latter, that is the whole composed of the outer annular organ 1 and the two cheeks 4A, 5A to pivot through a certain angle A relative to the fixed inner annular organ 2 about its median vertical equilibrium position under the influence of the force, in principle substantially vertical, to which it is subjected. In this example, the force between the shaft 7 and fixed support 65 is thus measured by the deformation produced in the compression strain gauges 16 carried by the connecting-rod 31.

FIGS. 13 and 14 illustrate another embodiment the general structure of which resembles that of the embodiment of FIGS. 3 and 4 but in which the device for measurement of force comprises a deformable elastic membrane 71 filled with a fluid. In these two figures, organs corresponding to those of the embodiment of FIGS. 3 and 4 are denoted by the same reference numbers.

The deformable elastic membrane 71 constitutes, in this example, a closed capacity completely filled with a liquid, for example with oil. Said capacity has substantially the form of a semi-cylindrical crown and is arranged in the upper half of the space delimited by the bore 73 of the inner annular organ 2, the internal faces of the two cheeks 4, 5 and the shaft 7.

The measuring device is completed by a tube 74 one end of which opens in the deformable elastic membrane 71 and the other end of which is fitted with a joint 75 by means of which it is connected to an apparatus for measurement of the variation in pressure within said membrane.

According to the nature of the fluid with which the elastic membrane is filled, that is according to whether it is a liquid or a gas, a suitable measuring apparatus of any known type may be used.

The deformable elastic membrane may be given a configuration differing from that illustrated according to the structure of the embodiment to which it is to be adapted.

In all the examples described above and in a general way, organs illustrated as cog wheels, pulleys or rollers can be replaced by each other or also by similar organs without in any way modifying the principle of the measurement of forces.

In addition, in the various examples illustrated, the compression strain gauges carried by the connecting-rod may, as a variant, be carried by the inner faces of the two cheeks or else by the internal face of the inner annular organ, the upper half of said organ being, preferably not rigidly connected to the cheeks so that it is able to deform elastically as a function of the forces transmitted by it.

Of course, the invention is not limited to the embodiments described and illustrated, modifications may be made to it according to the applications envisaged without thereby departing from the spirit of the invention.

What I claim is:

1. A device for the measurement of the relative radial force between a rotatable organ and a stationary support, comprising an outer annular organ to which a force is applied, the radial component of which is to be measured; an inner annular organ mounted concentrically within said outer annular organ; means for rotatably mounting said outer annular organ on said inner annular organ so that said outer annular organ rotates about a first common axis of said inner and outer annular organs in response to said force; a first end support flange mounted to one side surface of said inner annular organ; a second end support flange mounted to the other side surface of said inner annular organ and parallel with said first end support flange; means passing through said inner annular organ having a first end connected to said first end support flange and a second end connected to said second end support flange for mounting said end support flanges to said side surfaces of said inner annular organ; each of said inner annular organ, said first end support flange, and said second end support flange having an opening formed therethrough, the opening in said inner annular organ being greater than the openings in said first and second end support flanges and the opening in each of said inner annular organ and said first and second support flanges being in axial alignment; stationary support means for supporting said inner and outer annular organs and said end support flanges extending through each of said openings; and means mounted on at least one of said end support flanges and said inner annular organ for detecting deformation caused by said force, said openings in said first and second end support flanges, and said inner annular organ, said stationary support means for supporting said inner and outer annular organs and said first and second support flanges having a second common axis offset from said first common axis in a radial direction so that said first common axis, said second common axis, and said radial component of said force all lie in a common vertical plane, whereby in response to said force one of said end support flanges and said inner annular organ is deformed in response to the radial component thereof and is measured by said means for detecting.

2. The device according to claim 1, wherein said means for detecting deformation comprises a first strain gauge mounted on said first end support flange, and a second strain gauge mounted on said second end support flange, each of said first and second end support flanges having an outer surface, and an inner surface facing the other of said end support flanges, and being made of a deformable material, said inner surfaces mounting said first and second strain gauges thereon.

3. The device according to claim 2, wherein each of said openings formed in said first and second end support flanges and said inner annular organ is circular in shape, said inner annular organ being of a material that is relatively free from deformation by said force, said means for mounting said first and second end support flanges passing through said material.

4. The device according to claim 3, wherein said means for mounting said first and second end support flanges comprises a first bolt and a second bolt spaced diametrically opposite said first bolt.

5. The device according to claim 4, wherein said means for detecting deformation further comprises a first amplifier associated with said first strain gauge, and a second amplifier associated with said second strain gauge, whereby the output from said first and second strain gauges is amplified in order to be sent to a recording or other device for indicating the amount of said force.

6. The device according to claim 1, wherein said means for detecting deformation comprises a plurality of strain gauges, said inner annular organ mounting said plurality of strain gauges therein about said opening formed in said inner annular organ and being made of a deformable material, so that when said radial component of said force deforms said inner annular organ, said plurality of strain gauges will detect said radial component.

7. The device according to claim 6, wherein each of said flange openings formed in said first and second end support flanges and said inner annular organ is circular in shape, and said means for mounting said first and second end support flanges passes through said deformable material of said inner annular organ.

8. The device according to claim 7, wherein there are three strain gauges spaced 45° apart about said opening in said inner annular organ, said three strain gauges being positioned about that portion of said opening of said inner annular organ surrounding said stationary support means.

9. The device according to claim 8, wherein said means for mounting said first and second end support flanges comprises one bolt passing through that portion of said deformable material remote from said portion supporting thereon said three strain gauges, so that said portion of said deformable material supporting the three strain gauges is capable of deformation and is not hindered from such deformation by said bolt.

10. The device according to claim 9, wherein said first and second end support flanges are made of a material relatively free from deformation as compared to said deformable material.

* * * * *